(12) United States Patent
Yu et al.

(10) Patent No.: US 9,177,595 B2
(45) Date of Patent: Nov. 3, 2015

(54) MAGNETIC DISK DRIVE DEVICE, MAGNETIC DISK ASSEMBLY AND METHODS OF FORMING THE SAME

(71) Applicant: MARVELL INTERNATIONAL LTD., Hamilton (BM)

(72) Inventors: Yin Qian Yu, Singapore (SG); Chao Bi, Singapore (SG); Quan Jiang, Singapore (SG)

(73) Assignee: Marvell International LTD., Hamilton (BM)

( * ) Notice: Subject to any disclaimer, the term of this patent is extended or adjusted under 35 U.S.C. 154(b) by 0 days.

(21) Appl. No.: 14/260,536

(22) Filed: Apr. 24, 2014

(65) Prior Publication Data

US 2014/0321002 A1    Oct. 30, 2014

(30) Foreign Application Priority Data

Apr. 24, 2013   (SG) .............................. 201303102-6

(51) Int. Cl.
*G11B 17/02*   (2006.01)
*G11B 19/20*   (2006.01)
*G11B 17/028*   (2006.01)

(52) U.S. Cl.
CPC ........ *G11B 19/2045* (2013.01); *G11B 17/0287* (2013.01); *G11B 17/02* (2013.01); *Y10T 29/49002* (2015.01)

(58) Field of Classification Search
CPC .................................................. G11B 19/2045
USPC ....................................... 360/97.11
See application file for complete search history.

(56) References Cited

U.S. PATENT DOCUMENTS

| | | | |
|---|---|---|---|
| 5,517,376 A * | 5/1996 | Green ......................... | 360/98.08 |
| 6,366,427 B1 * | 4/2002 | West .......................... | 360/99.12 |
| 8,908,325 B1 * | 12/2014 | Heo et al. ................... | 360/99.12 |
| 2003/0214752 A1 * | 11/2003 | Hashizume et al. ........ | 360/99.12 |
| 2005/0094313 A1 * | 5/2005 | Kim ............................ | 360/97.02 |

* cited by examiner

*Primary Examiner* — Wayne Young
*Assistant Examiner* — Carlos E Garcia

(57) ABSTRACT

A magnetic disk drive device for rotary driving a magnetic disk may be provided. The magnetic disk drive device may include a drive motor for rotary driving the magnetic disk. The drive motor may include a motor hub which has motor hub support portion with a screw-type motor hub engaging portion, and a motor hub support surface for supporting the magnetic disk. The magnetic disk drive device may also include a clamp disk including a clamp disk support portion with a screw-type clamp disk engaging portion complementary to the motor hub engaging portion, and a clamp disk support surface for supporting the magnetic disk.

16 Claims, 9 Drawing Sheets

300 provide a drive motor for rotary driving the magnetic disk, the drive motor including a motor hub which has a motor hub support portion with a screw-type motor hub engaging portion and with a motor hub support surface for supporting the magnetic disk at a first magnetic disk surface.

302 connecting a clamp disk to the motor hub via a screw engagement between the motor hub engaging portion and a screw-type clamp disk engaging portion of a clamp disk support portion of the clamp disk

304

MAGNETIC DISK DRIVE DEVICE, MAGNETIC DISK ASSEMBLY AND METHODS OF FORMING THE SAME

CROSS-REFERENCE TO RELATED APPLICATIONS

This application claims the benefit of priority of SG application No. 201303102-6 filed Apr. 24, 2013, the contents of it being hereby incorporated by reference in its entirety for all purposes.

TECHNICAL FIELD

Various aspects of this disclosure relate to magnetic disk drive devices and magnetic disk drive assemblies.

BACKGROUND

When a magnetic disk, i.e. a hard disk drive medium disk is assembled to the spindle motor, the disk clamp should provide sufficient clamping force to tighten the magnetic disk and eliminate relative movement of the magnetic disk to the motor hub.

In conventional hard disks, an external bolt is used to secure the disk clamp to the spindle motor. As a result, it is difficult to reduce the height of the hard disk drive. Further, the deflection of the magnetic disk is too great for magnetic disks of high areal densities.

SUMMARY

In various embodiments, a magnetic disk drive device for rotary driving a magnetic disk may be provided. The magnetic disk drive device may include a drive motor for rotary driving the magnetic disk. The drive motor may include a motor hub which has motor hub support portion with a screw-type motor hub engaging portion. The motor hub support portion may further include a motor hub support surface for supporting the magnetic disk at a first magnetic disk surface.

The magnetic disk drive device may also include a clamp disk including a clamp disk support portion with a screw-type clamp disk engaging portion complementary to the motor hub engaging portion so that the clamp disk and the motor hub are connectable to each other via a screw engagement between the motor hub engaging portion and the clamp disk engaging portion. The clamp disk support portion may also include a clamp disk support surface for supporting the magnetic disk at a second magnetic disk surface opposite the first magnetic disk surface. The clamp disk support surface may face the motor hub support surface when the clamp disk and the motor hub are in screw engagement, thereby allowing the magnetic disk to be supported between the motor hub and the clamp disk in a clamping manner by being clamped in between the motor hub support surface and the clamping disk support surface. The clamp disk and the motor hub, when engaged with each other, may be provided to be concentric with regard to a rotation axis of the motor hub. Correspondingly, the motor engaging portion and the clamp disk engaging portion, when engaged with each other, may provide to be concentric with regard to the rotation axis of the motor hub.

In various embodiments, a method of forming a magnetic disk drive device may be provided. The method may include providing a drive motor for rotary driving the magnetic disk. The drive motor may include a motor hub which has a motor hub support portion with a screw-type motor hub engaging portion and with a motor hub support surface for supporting the magnetic disk at a first magnetic disk surface.

The method may also include connecting a clamp disk to the motor hub via a screw engagement between the motor hub engaging portion and a screw-type clamp disk engaging portion of a clamp disk support portion of the clamp disk. The clamp disk engaging portion may be complementary to the motor hub engaging portion. The clamp disk support portion may further include a clamp disk support surface for supporting the magnetic disk at a second magnetic disk surface opposite the first magnetic disk surface. The clamp disk support surface may face the motor hub support surface when the clamp disk and the motor hub are in screw engagement, thereby allowing the magnetic disk to be supported between the motor hub and the clamping disk in a clamping manner by being clamped in between the motor hub support surface and the clamping disk support surface.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

It should be understood that the terms "bottom", "top", "side" etc., when used in the following description are used for convenience and to aid understanding of relative positions or directions, and not intended to limit the orientation of any device or assembly or any part of any device or assembly.

Figure 1:
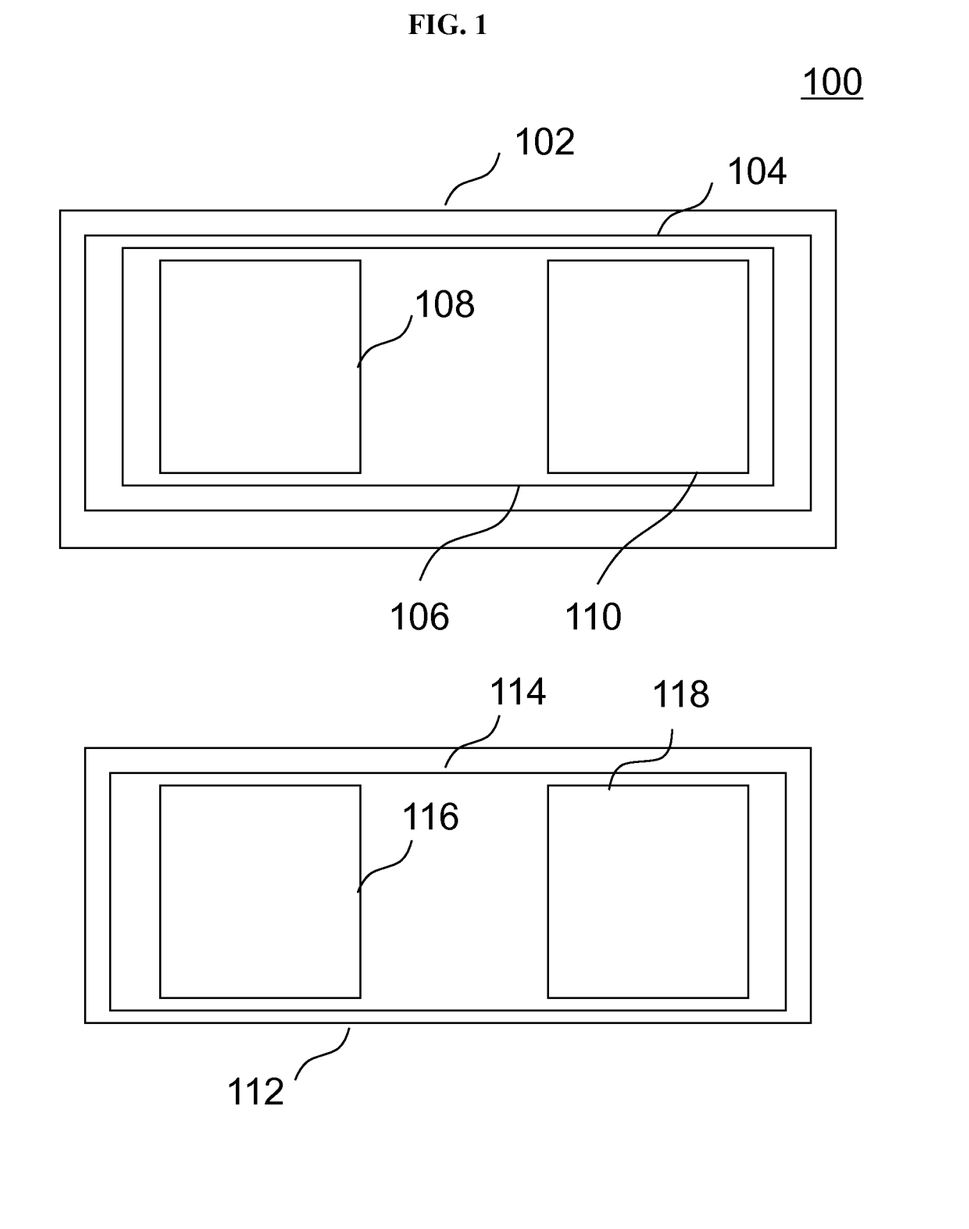
FIG. 1 is a schematic of a magnetic disk drive device for rotary driving a magnetic disk according to various embodiments.

FIG. 1 is a schematic of a magnetic disk drive device 100 for rotary driving a magnetic disk according to various embodiments. The magnetic disk drive device 100 may include a drive motor 102 for rotary driving the magnetic disk. The drive motor 102 may include a motor hub 104 which has motor hub support portion 106 with a screw-type motor hub engaging portion 108. The motor hub support portion 106 may also include a motor hub support surface 110 for supporting the magnetic disk at a first magnetic disk surface.

The magnetic disk drive device 100 may also include a clamp disk 112 including a clamp disk support portion 114 with a screw-type clamp disk engaging portion 116 complementary to the motor hub engaging portion 108 so that the clamp disk 112 and the motor hub 104 are connectable to each other via a screw engagement between the motor hub engaging portion 108 and the clamp disk engaging portion 116. The clamp disk support portion 114 may also include a clamp disk support surface 118 for supporting the magnetic disk at a second magnetic disk surface opposite the first magnetic disk surface. The clamp disk support surface 118 may face the motor hub support surface 110 when the clamp disk 112 and the motor hub 104 are in screw engagement, thereby allowing the magnetic disk to be supported between the motor hub 104 and the clamp disk 112 in a clamping manner by being clamped in between the motor hub support surface 110 and the clamp disk support surface 118.

In other words, a magnetic disk drive device 100 may be provided including a drive motor 102 and a clamp disk 112. The drive motor 102 may include a motor hub 104 having a motor hub support portion 106. The motor hub support portion 106 may include a motor hub engaging portion 108 and a motor hub support surface 110. The clamp disk 112 may have a clamp disk support portion 114. The clamp disk support portion 114 may have a clamp disk engaging portion 116 and a clamp disk support surface 118. The clamp disk engaging portion 116 may be screw-type. The motor hub engaging portion 108 and the clamp disk engaging portion 116 may be coupled together using a screw engagement to join the clamp disk 112 and the motor hub 104. When the motor hub engaging portion 108 and the clamp disk engaging portion 116 are coupled to together, the motor hub support surface 110 and the clamp disk support portion 118 may be adapted or configured to clamp a magnetic disk. The magnetic disk may have a first surface and a second surface opposite the first surface. The motor hub support surface 110 may contact the first surface while the clamp disk engaging portion 116 may support the second surface of the magnetic disk.

Various embodiments may remove the need for an external screw to fasten the clamp disk 112 to the motor hub 104. The removal of the need of the external screw may reduce the height of the magnetic disk drive assembly. Various embodiments may provide a stronger structure than conventional assemblies using conventional clamping. Various embodiments may also provide a greater clamping force to reduce the deflection of the magnetic disk compared to conventional disk clamps. Various embodiments may be able to address low profile hard disk drive motor requirements and/or high areal density requirements.

Figure 2A:
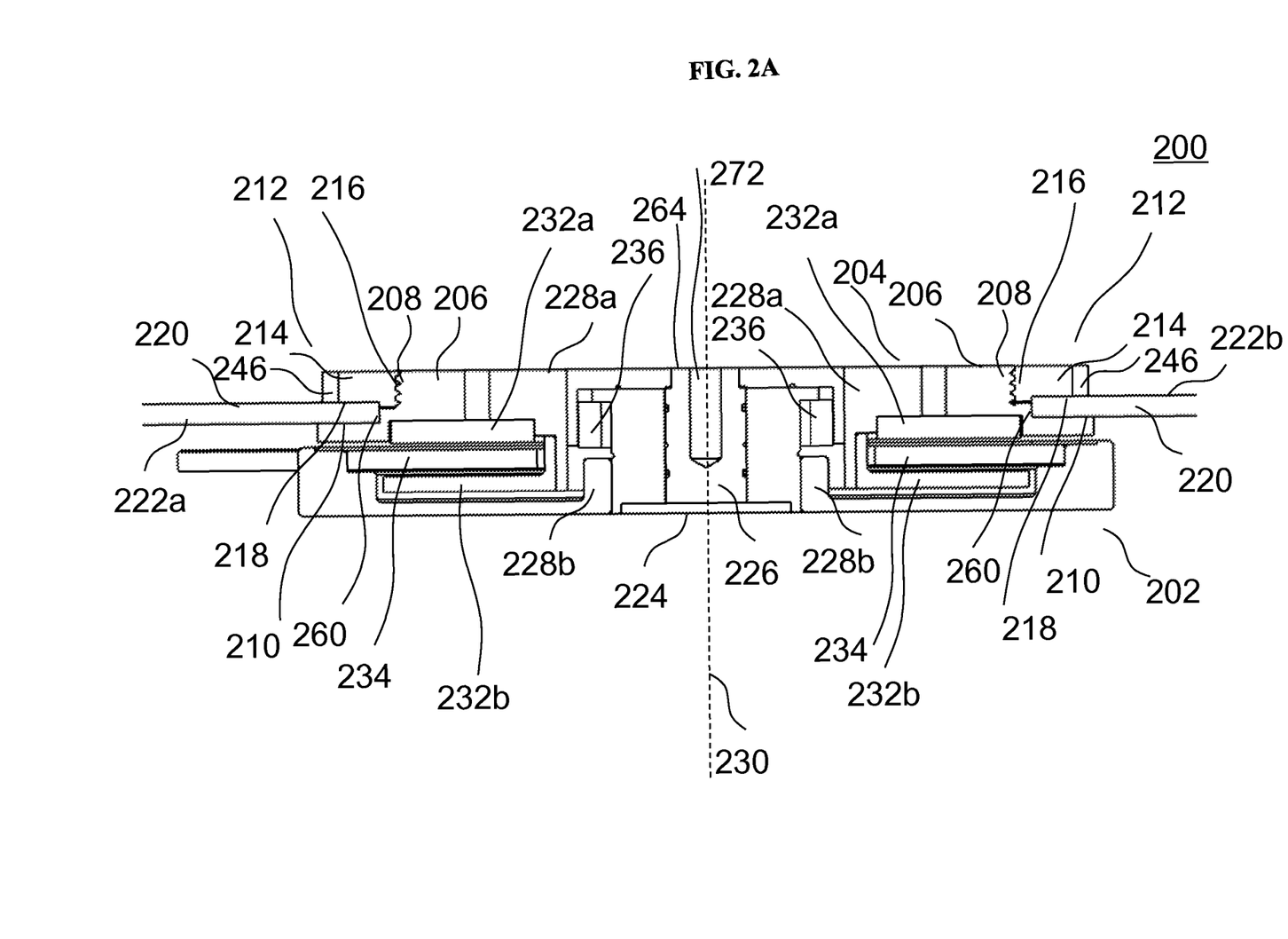
FIG. 2A is a cross-sectional side view of a magnetic disk drive device for rotary driving a magnetic disk according to various embodiments.
Figure 2B:
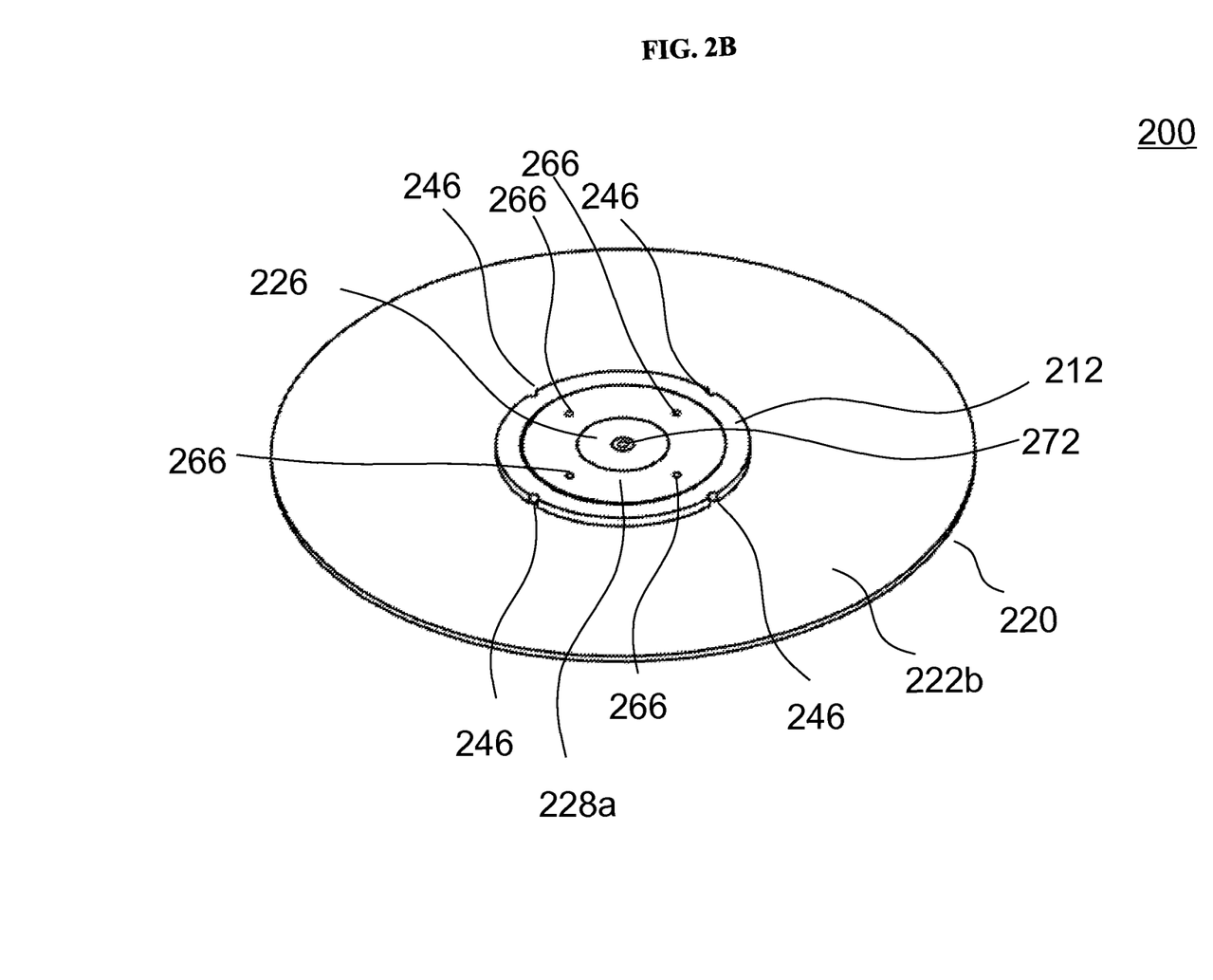
FIG. 2B is a perspective view of the magnetic disk drive device illustrated in FIG. 2A according to various embodiments.

FIG. 2A is a cross-sectional side view of a magnetic disk drive device 200 for rotary driving a magnetic disk 220 according to various embodiments. FIG. 2B is a perspective view of the magnetic disk drive device 200 illustrated in FIG. 2A according to various embodiments. The magnetic disk drive device 200 may include a drive motor 202 for rotary driving the magnetic disk 220. The drive motor 202 may include a motor hub 204 which has motor hub support portion 206 with a screw-type motor hub engaging portion 208. The motor hub support portion 206 may further include a motor hub support surface 210 for supporting the magnetic disk 220 at a first magnetic disk surface 222a.

The magnetic disk drive device 200 may also include a clamp disk 212 including a clamp disk support portion 214 with a screw-type clamp disk engaging portion 216 complementary to the motor hub engaging portion 208 so that the clamp disk 212 and the motor hub 204 are connectable to each other via a screw engagement between the motor hub engaging portion 208 and the clamp disk engaging portion 216. The clamp disk support portion 214 may also include a clamp disk support surface 218 for supporting the magnetic disk 220 at a second magnetic disk surface 222b opposite the first magnetic disk surface 222a. The clamp disk support surface 218 may face the motor hub support surface 210 when the clamp disk 212 and the motor hub 204 are in screw engagement, thereby allowing the magnetic disk 220 to be supported between the motor hub 204 and the clamp disk 212 in a clamping manner by being clamped in between the motor hub support surface 210 and the clamp disk support surface 218.

The clamp disk 212 may be screwed onto the motor hub 204. The magnetic disk 220 may be positioned on the motor hub support surface 210 before the clamp disk 212 is screwed onto the motor hub 204 so that the magnetic disk 220 is clamped between the motor hub 204 and the clamp disk 212. The screw engagement may secure the clamp disk 212 to the motor hub 204. The securing of the clamp disk 212 to the motor hub 204 may reduce or prevent the movement of the magnetic disk 220 relative to the motor hub 204 so the magnetic disk 220 is effectively held by the motor hub 204 and the clamp disk 212.

The drive motor 202 may be a spindle motor such as a low profile motor. The drive motor 202 may be a radial field spindle motor or an axial field motor. The drive motor 202 may include a motor base 224. The drive motor 202 may further include a motor shaft 226 extending from the motor base 224. The motor hub 204 may include a top yoke 228a and a bottom yoke 228b. The top yoke 228a and the bottom yoke 228b may make up a rotor yoke. The rotor yoke may be pivotally mounted about a longitudinal axis of rotation 230, on the motor base 224. The motor hub 204 may also include a magnet disk including a top magnet 232a and a bottom magnet 232b. The top magnet 232a may be positioned in contact with the top yoke 228a. The bottom magnet 232b may be positioned in contact with the rotor bottom yoke 228b. The drive motor 202 may further include a stator 234 having an armature winding positioned between the top magnet 232a and the bottom magnet 232b. The motor hub 204 may be configured to rotate about the longitudinal axis 230 on bearings 236 such as hydrodynamic bearings. A drive motor 202 with hydrodynamic bearings may be referred to as a fluid dynamic bearing motor ("FDB" motor). In various alternate embodiments, the drive motor 202 may include ball bearings instead of hydrodynamic bearings. While FIG. 2A shows that the stator 234 is sandwiched by magnets 232a and 232b, it may be envisioned that magnets are provided only on one side of the stator 234.

The clamp disk 212 and the motor hub 204, when in engagement with each other, may be concentrically arranged with respect to the axis of rotation of 230. Correspondingly, the motor hub engaging portion 206 and the clamp disk engaging portion 216, when in engagement with each other, may be concentrically arranged with respect to the axis of rotation 230. Further correspondingly, the magnetic disk 220, when supported between and by the clamp disk 212 and the motor hub, may be concentrically arranged with respect to the axis of rotation 230.

During operation, the stator 234 may be magnetized by a current flowing through the armature winding. The magnets 232a and/or 232b may experience a magnetic force exerted by the magnetized stator 234. The magnets 232a and/or 232b may cause the motor hub 204 including the rotor yoke to rotate around the axis 230. The stator 234 may remain stationary.

The drive motor 202 may be a fixed or bonded shaft FDR motor drive. In a fixed or bonded shaft FDR motor drive, the motor hub 204 rotates about shaft 226 which is stationary. In various alternate embodiments, the drive motor 202 may be a rotating shaft FDR motor drive in which the shaft 226 rotates with the motor hub 204 about axis 230.

Figure 2C:
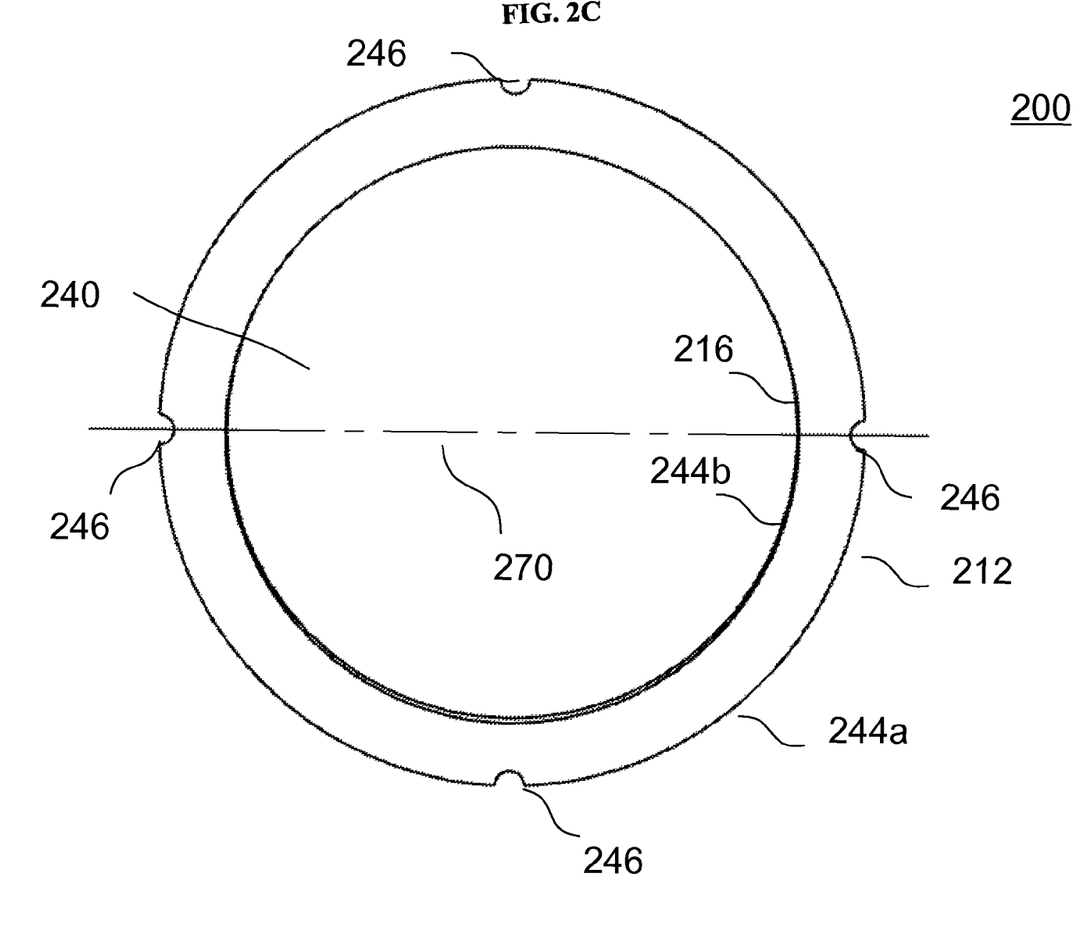
FIG. 2C is a top view of the clamp disk shown in FIGS. 2A and 2B according to various embodiments.
Figure 2D:
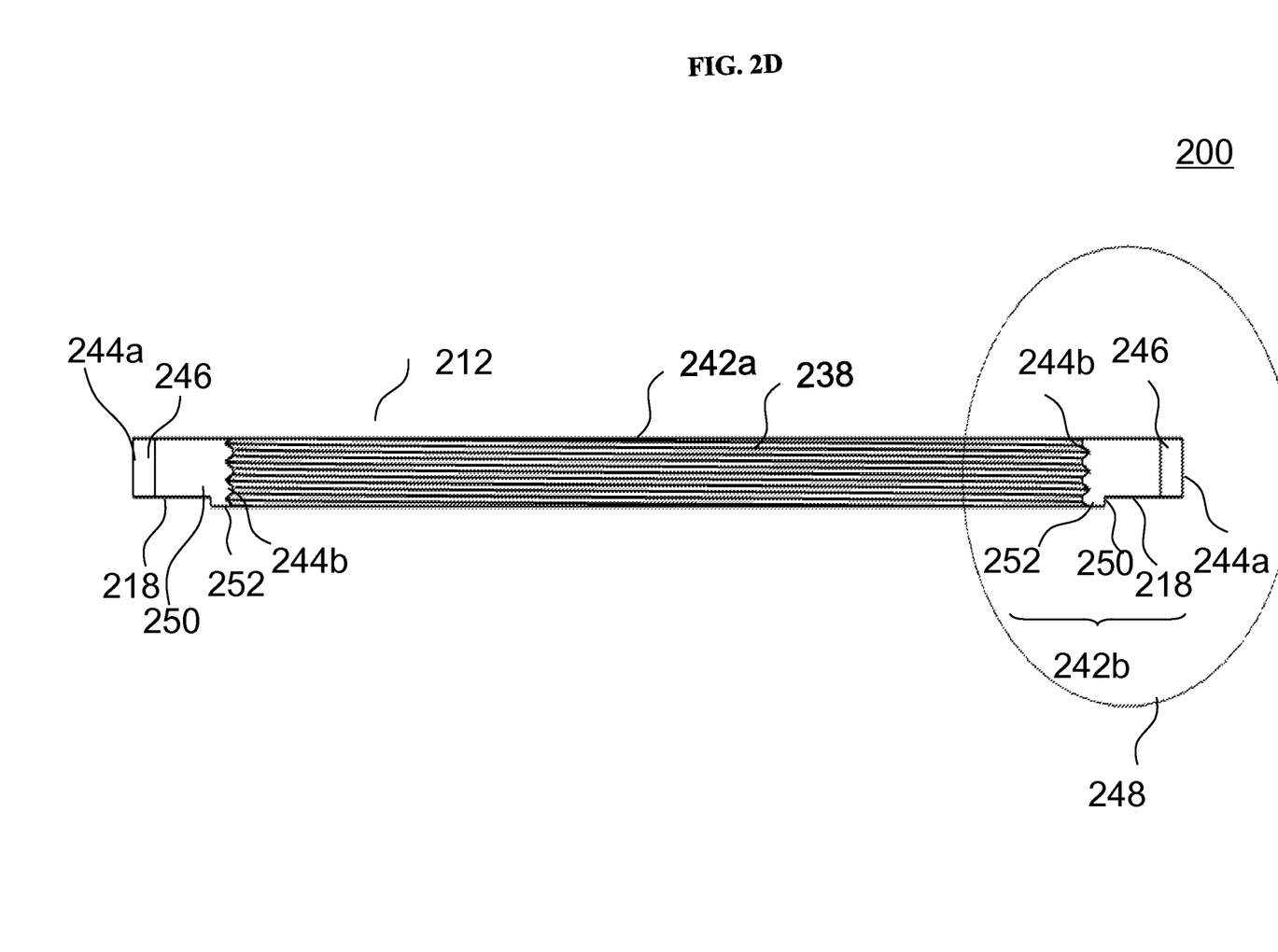
FIG. 2D is a cross-sectional side view of an inner thread of the clamp disk according to various embodiments.

FIG. 2C is a top view of the clamp disk 212 shown in FIGS. 2A and 2B according to various embodiments. FIG. 2D is a cross-sectional side view of the clamp disk 212 according to various embodiments. FIG. 2D may correspond to the cross-sectional side view of clamp disk 212 indicated by line 270. As evident from FIG. 2C, the clamp disk 212 may be of ring-shape. The clamp disk 212 may have a first surface 242a and a second surface 242b. The first surface 242a may be opposite to the second surface 242b. Additionally, the clamp disk 212 may have an outer circumference 244a and an inner circumference 244b. The outer circumferential wall or side 244a may extend from an end (e.g., radial outer end) of the first surface 242a to an end (e.g., radial outer end) of the second surface 242b. The inner circumferential wall or side 244b may extend from a further end (e.g., radial inner end) of the first surface 242a to a further end (e.g., radial inner end) of the second surface 242b.

The clamp disk 212 may have an inner through-hole 240 which is provided with an inner thread 238 to form the clamp disk engaging portion 216. The clamp disk 212 may be provided with one or more notches 246 on its outer circumference 244a for allowing to be engaged by a mounting tool. Alternatively, the one or more notches 246 may be provided on any suitable position on the clamp disk 212 such as on surface 242a. The one or more notches 246 may also be referred to as tooling holes.

Any suitable number of notches 246 may be provided. The number of notches 246 may be odd or even. For instance, the clamp disk 246 may be provided with four notches as shown in FIGS. 2B and 2C. The distance between a notch and a first neighouring notch may be substantially equal to the distance between the notch and a second neighbouring notch. In other words, the notches 246 may be provided at substantially equal (circumferential) intervals. The notches 246 may be of different shapes such as circular, square etc. The notches 246 may be adapted or configured to fit with the mounting tool. The mounting tool may be used for assembling the clamp disk 212 on to the drive motor 202 and/or for removal of the clamp disk 212 from the drive motor 202. As such, the notches 246 may facilitate the easy attachment of the clamp disk 212 to the drive motor and/or the easy removal of the clamp disk 212 from the drive motor 202.

The inner circumferential wall 244b may be defined by the inner through-hole 240. The inner thread 238 may be on the inner circumferential wall 244b of the clamp disk 212. In various embodiments, there may be only one inner thread 238 on the inner circumferential wall 244b of the clamp disk 212. In various alternate embodiments, there may be more than one inner threads 238 on the inner circumferential wall 244b of the clamp disk 212. In other words, the inner circumferential wall 244b of the clamp disk 212 may be single threaded or multi-threaded. The thread size may be adapted to or configured to fit with one or more external threads of the motor hub 204. The inner circumferential wall 244a and/or the outer circumferential wall 244b may be substantially parallel to axis 230. The inner circumferential wall 244a and/or the outer circumferential wall 244b may also be substantially perpendicular to the first surface 242a and/or the second surface 242b.

Figure 2E:
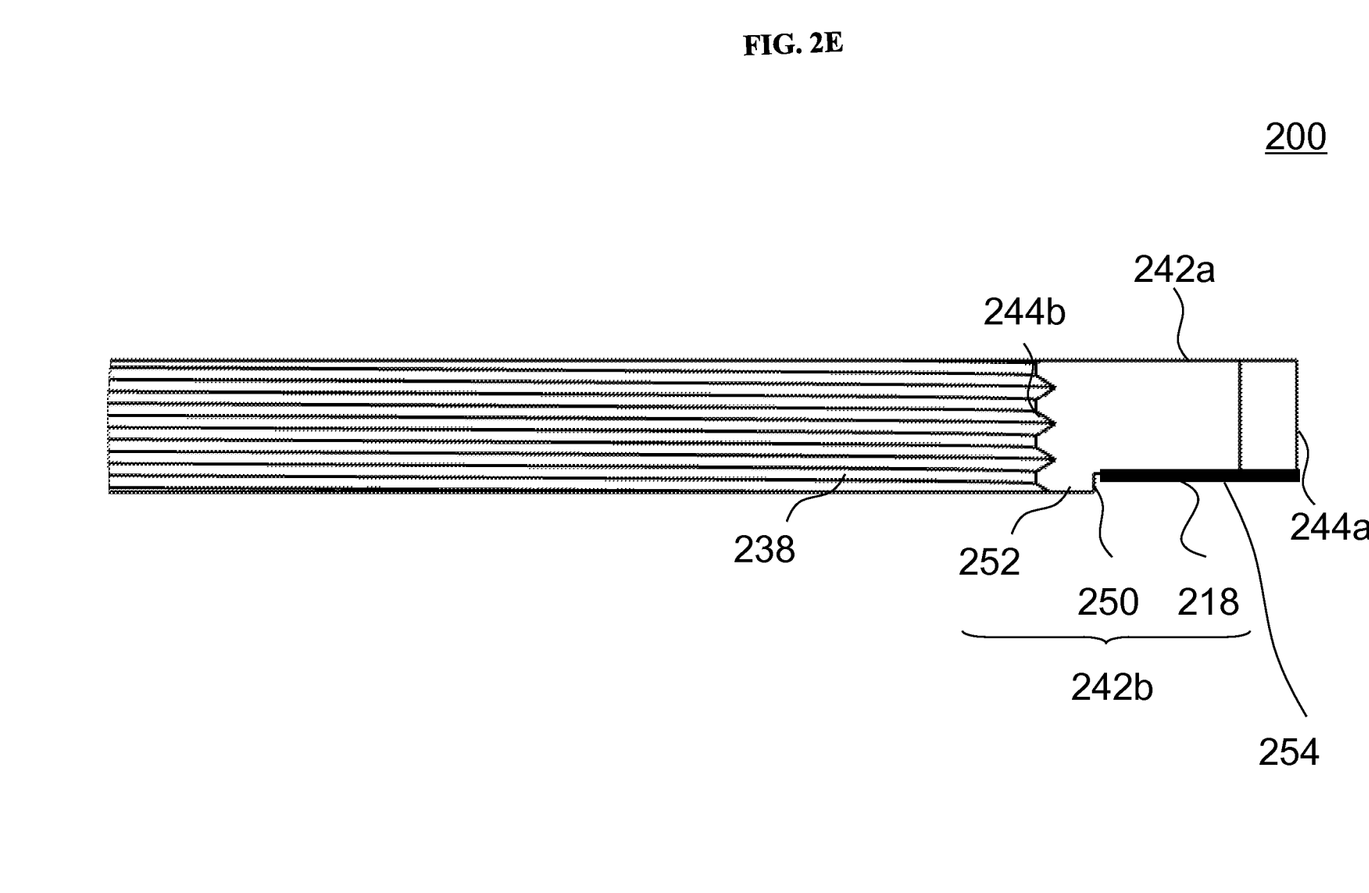
FIG. 2E is a zoomed-in cross-sectional side view of the clamp disk illustrated in FIG. 2D according to various embodiments.

FIG. 2E is a zoomed-in cross-sectional side view of the clamp disk 212 illustrated in FIG. 2D according to various embodiments. FIG. 2E may correspond to the view indicated by circle 248 in FIG. 2D. The clamp disk support surface 218 may be a portion of the second surface 242b. The clamp disk support portion 214 may include a radial circumferential clamp disk shoulder 250 limiting an inner circumference of the clamp disk support surface 218 and facing radially outwardly. In other words, the second surface 242b may include a clamp disk support surface 218 at an outer circumferential wall 244a. The second surface 242b may further include a contact surface 252 at an inner circumferential wall 244b, which contact surface 252 may be at least substantially parallel or parallel to the disk support surface 218 and arranged in an axial distance thereto (when seen along rotation axis 230). The contact surface 252 and the clamp disk support surface 218 may be separated by the inner circumference of the clamp disk support surface 218 defined by the circumferential clamp disk shoulder 250. The contact surface 252 may be substantially parallel to the clamp disk support surface 218. The radial circumferential clamp disk shoulder 250 may be at least substantially perpendicular or perpendicular to the clamp disk support surface 218 and/or the contact surface 252. The radial circumferential clamp disk shoulder 250 may be at least substantially parallel or parallel to axis 230. The height of the inner circumferential wall 244b, measured parallel to axis 230, may be greater than height of the outer circumferential wall 244a. The height of the inner circumferential wall 244b may be substantially equal or equal to the sum of the height of the outer circumferential wall 244a and the axial height or length of the radial circumferential clamp disk shoulder 250.

The provision of a radial circumferential clamp disk shoulder 250, i.e. stair-stepping, may allow the inner circumferential wall height to be longer than the outer circumferential wall height and thus allow for a longer inner thread or threads 238 on the inner circumferential wall 244b of the clamp disk 212. A longer inner thread or threads 238 increases the strength of the longer inner thread or threads 238 and may thus increases the clamping force.

The clamp disk support surface 218 may be provided with a soft damping layer 254 of a damping material. The layer 254 may increase static friction force between the clamp disk 212 and the magnetic disk 220. The layer 254 may further protect the magnetic disk 220 from clamp disk 212. For instance, the layer 254 may protect the clamp disk for scratching the second surface 222b of the magnetic disk 220. The soft damping layer 254 may be of rubber material or any other suitable materials such as polymeric materials. The soft damping material 254 may be thin relative to the magnetic disk 220. Additionally, a lubricant layer may be present on the magnetic disk 220. The lubricant layer may be between the clamp disk support surface 218 and the magnetic disk 220.

Figure 2F:
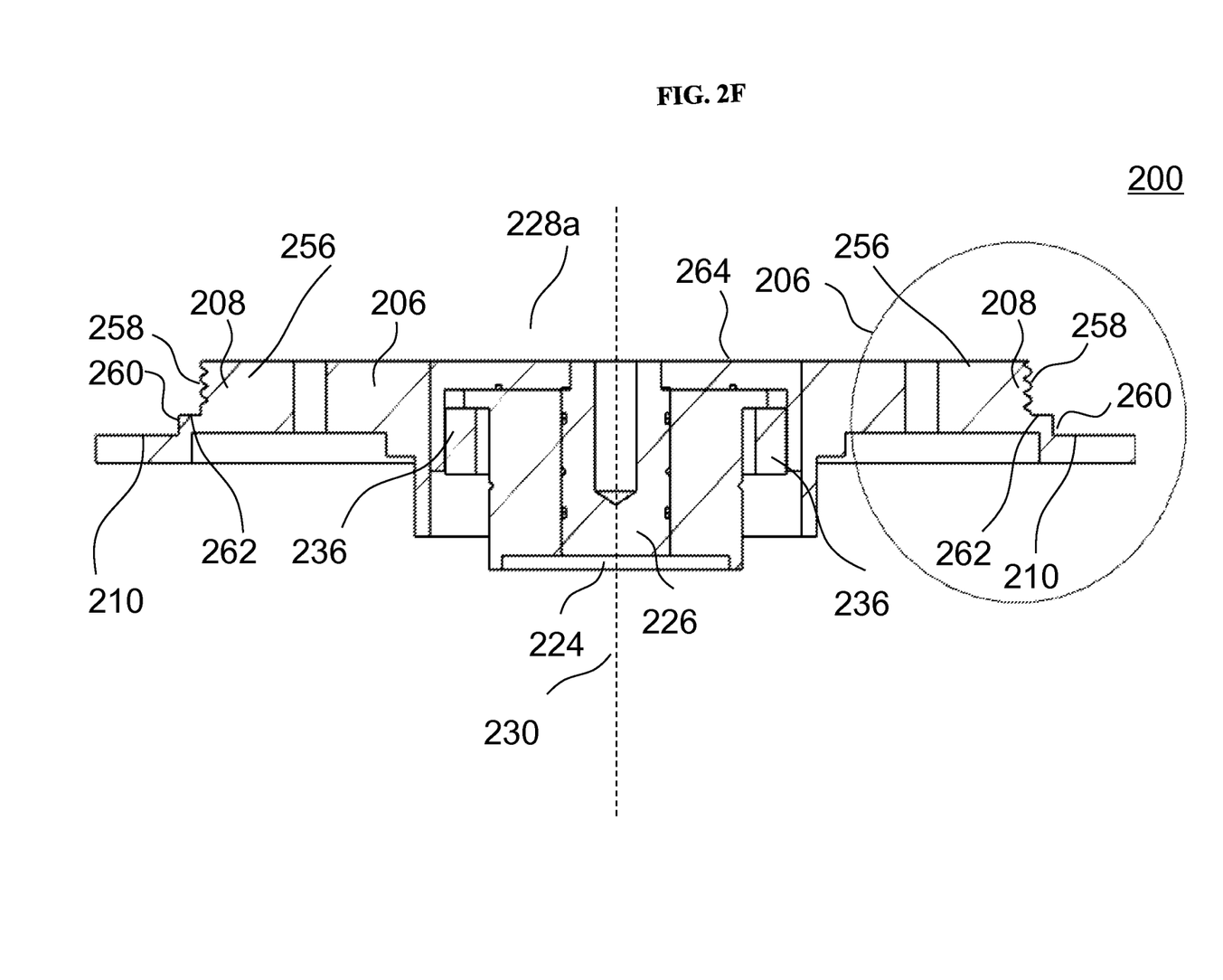
FIG. 2F shows a cross-sectional side view of the top yoke according to various embodiments.
Figure 2G:
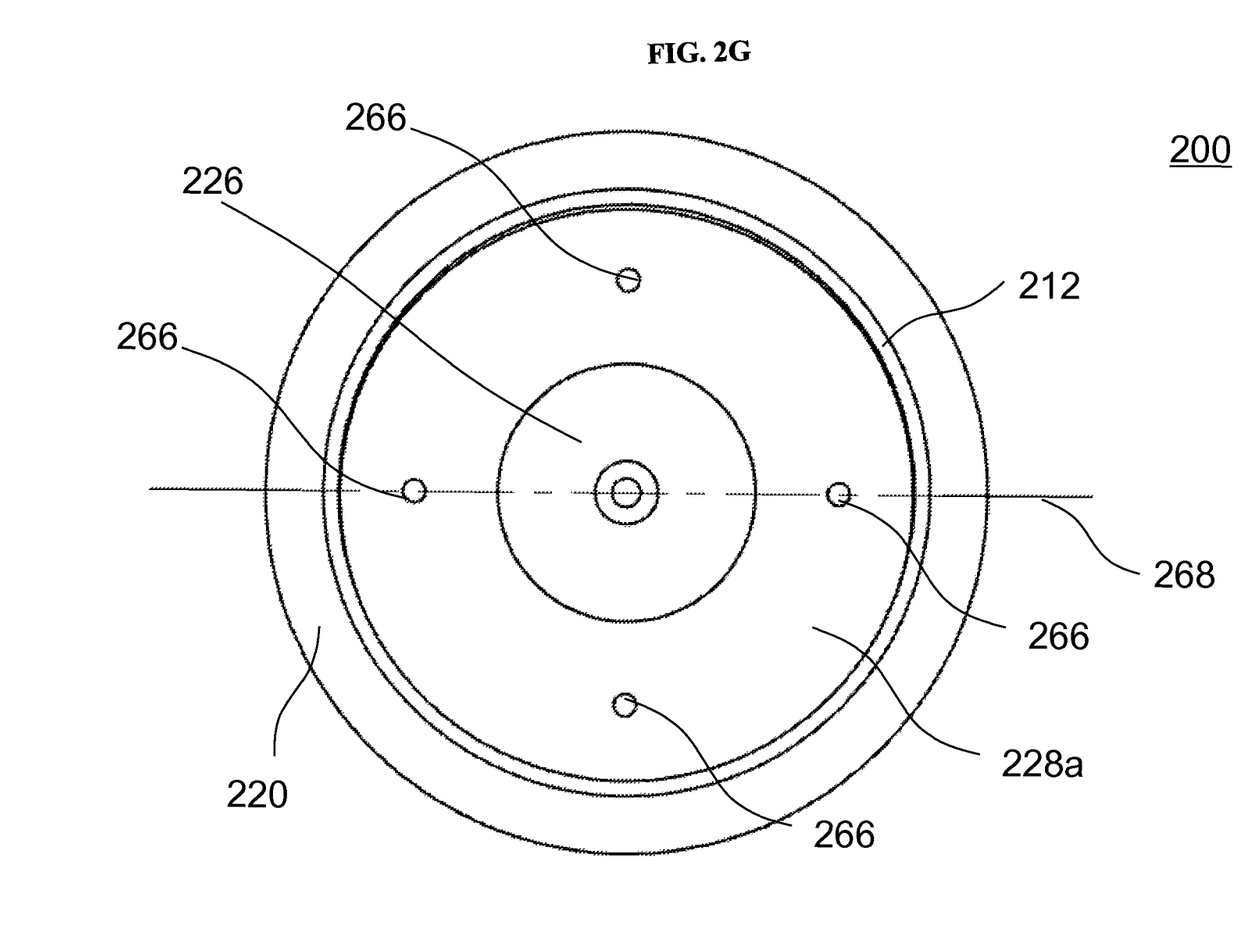
FIG. 2G shows the top planar view of the magnetic disk assembly according to various embodiments.

FIG. 2F shows a cross-sectional side view of the top yoke 228a according to various embodiments. FIG. 2G shows the top planar view 200g of the magnetic disk assembly according to various embodiments. The line 268 in FIG. 2G may correspond to the cross-sectional side view illustrated in FIG. 2A. The top yoke 228a may be disk-shaped. In other words, the motor hub 204 may have a disk-shaped top yoke 228a. The top yoke 228a may be attached to a motor shaft 226 of the drive motor 202 and may be on which the motor hub engaging portion 208 and the motor hub support surface 210 are provided. The top yoke 228a may include a shaft receiving through hole in which the shaft 226 is accommodated. The shaft receiving through may be concentric to the rotation axis 230. The top yoke 228a may be detachably attached to the motor shaft 226 by means of a screw connection which is concentric with respect to a longitudinal axis 230 of the motor shaft 226. The top yoke 228a may be attached to the motor shaft 226 by any other means. In various other embodiments, the top yoke 228a may not be attached to the motor shaft 226.

In bonded or fixed shaft motor drives, the first axial end of the bearing may be fixed to a base and the second end of the bearing may be fixed to the cover of the hard disk drive. In rotating shaft motor drives, a first axial end of the bearings may be fixed to the base while a second axial end of the bearings may be free (like in a cantilever structure). Various embodiments may not require the use of an external screw for securing the clamp disk to the motor hub and allow for the bonded or fixed shaft motor drive to be used. For bonded or fixed shaft motor drives, an external screw may instead be needed to secure a mounted top cover of the hard disk drive with the bonded or fixed shaft. For a bonded or fixed shaft motor drive, the hole 272 for receiving the external screw to secure the top cover, may be provided with an inner thread. For the bonded or fixed shaft motor drive, the provision of the clamp disk 212 with a screw-type clamp disk engaging portion 216 may increase the stiffness of the hard disk drive cover and/or the total stiffness of the hard disk drive including the drive motor, thus significantly reducing the vibration level and increasing shock capability. For a rotating shaft motor drive 200, the through hole may be smooth and free of any inner threads. For the rotating shaft motor drive, the stiffness of the FDB may be increased and the vibration and acoustic noise level may be reduced and dynamic performance may be improved.

The motor hub 204 may have a protrusion 256 provided with an outer thread 258 to form the motor hub engaging portion 208. In various alternate embodiments, the protrusion 256 may be provided with more than one outer threads. In other words, the protrusion 256 may be single threaded or multi-threaded. The protrusion 256 may be configured to fit into the inner through-hole 240 of the clamp disk 212. The diameter defining the inner circumferential wall 244b of the clamp disk 212 may be substantially equal or greater than the diameter defining an outer circumference of the protrusion 256.

The motor hub support portion 206 may have a radial circumferential motor hub shoulder 260 limiting an inner circumference of the motor hub support surface 210 and facing radially outwardly. The motor hub support portion 206 may further have a contact surface 262. The contact surface 262 may be at least substantially parallel or parallel to the motor hub support surface 210.

The clamp disk shoulder 250 and the motor hub shoulder 260 may be radially flush when the motor hub 204 and the clamp disk 212 are engaged with each other so as to be able to provide a common inner radial abutment for an inner circumferential wall of the magnetic disk 220. The contact surface 262 of the motor hub support portion 206 may be in contact with the contact surface 252 of the clamp disk 212.

A magnetic disk assembly may also be provided according to various embodiments. The magnetic disk assembly may include a magnetic disk drive 100, 200 as described herein and the magnetic disk 220.

The magnetic disk 220 may be a ring-shaped disk. As highlighted above, the magnetic disk 220 may have a first surface 222a and a second surface 222b opposite to the first surface 222a. The inner circumferential wall of the magnetic disk 220 may join a first end (e.g., radial inner end) of the first surface 222a with a first end (e.g., radial inner end) of the second surface 222b. An outer circumferential wall may join a second end (e.g., radial outer end) of the first surface 222a with a second end (e.g., radial outer end) of the second surface 222b.

The magnetic disk 220 may include a platter. A magnetic layer of magnetizable material for storing data may be coated on the platter. The platter may be made of a material such as aluminum, glass or ceramics. The magnetic layer on the platters may include a plurality of domains of magnetization that are oriented to store information that is transferred through the magnetic head. The magnetizable material may include, but is not limited to, cobalt-chromium-platinum alloys, nickel-iron or cobalt-iron alloys. Data may be written to the magnetic disk 220 using perpendicular recording or longitudinal recording.

The magnetic disk 220 may include a parking zone located at an inner circumferential side or wall of the disk 220. The magnetic disk may also include a data zone located at an outer circumferential side of the disk 220. The data zone may be separated from the parking zone by a boundary. The data zone may be configured to store data. A slider, on which a magnetic head is mounted, may be accommodated in the parking zone when power is turned off.

The clamp disk 212 may have an outer diameter smaller than a diameter defining the boundary (of the magnetic disk 220). In other words, the parking zone of the magnetic disk 220 may be (only) partially covered by the clamp disk 212 during operation. The slider may be accommodated in the uncovered portion of the parking zone when power is turned off. The data zone of the magnetic zone 220 may be completely exposed. During operation, the slider may be moved over to the data zone so that the magnetic head may access data to and from the data zone.

The (axial) distance between the motor hub support surface 210 and a free end surface 264 of the protrusion 256 may be at least substantially equal or equal to the combination of the thicknesses of the magnetic disk 220 and the clamp disk 212 so that, when the magnetic disk 220 is clamped between the motor hub 204 and the clamp disk 212, the free end surface 264 of the protrusion 256 is at least substantially flush or flush with that surface (i.e. the first surface 242a) of the clamp disk 212, which is opposite to the clamp disk support surface 218. In other words, the free end surface 264 of the protrusion 256 and the first surface 242a of the clamp disk 212 may be aligned in a substantially straight line when viewed laterally. As the first surface 242a of the clamp disk 212 is substantially flush with the free end surface 264 of the protrusion 256, the clamp disk 212 may not take up extra height parallel to axis 230. In contrast, conventional clamping may require extra height.

An axial height of the motor hub shoulder 260 may be smaller than a thickness of the magnetic disk 220. Likewise, an axial height of the clamp disk shoulder 250 may also be smaller than the thickness of the magnetic disk 220. The motor hub 204 may be configured such that the sum of the axial height of the motor hub shoulder 260 and the axial height of the clamp disk shoulder 250 is less than the thickness of the magnetic disk 220.

The clamp disk shoulder 250 and the motor hub shoulder 260 may be radially flush when the motor hub 204 and the clamp disk 212 are engaged with each other so as that, when the magnetic disk 220 is clamped between the motor hub 204 and the clamp disk 212, an inner circumferential wall of the magnetic disk 220 radially abuts both the motor hub shoulder 260 and the clamp disk shoulder 250.

The vertical movement of the magnetic disk 220 relative to motor hub 204 may be prevented or reduced by the clamp disk support surface 218 of the clamp disk 212 and the motor hub support surface 210 of the motor hub 204. The horizontal movement of the magnetic disk 220 relative to motor hub 204 may be prevented or reduced by the clamp disk shoulder 250 and the motor hub shoulder 260. Various embodiments may provide an effective means for preventing or reducing both vertical and horizontal movement of the magnetic disk 220 relative to the motor hub 204.

The top yoke 228a may include one or more positioning structures 266 on, e.g., the free surface 264 of the protrusion 256. The top yoke 228a may be secured using the one or more positioning structures 266 when the clamp disk 212 is moved into screw engagement with the motor hub 204, i.e. when the clamp disk 212 is screwed onto the motor hub 204. For instance, a positioning tool may be used to engage the positioning structure 266 to reduce or prevent movement of the top yoke 228a, such as rotary movement of the top yoke 228a about axis 230, when the clamp disk 212 is screwed onto the motor hub 204. In various embodiments, the positioning tool may be the mounting tool. The mounting tool used to engage the notches 246 may at the same time be used to engage the positioning structures 266.

The (circumferential) distance between an a positioning structure and a first neighbouring positioning structure may be substantially equal to the (circumferential) distance between the positioning structure and a second neighbouring positioning structure. In other words, the positioning structures 266 may be provided at substantially equal (circumferential) intervals.

The one or more positioning structures 266 may be positioning holes.

The positioning holes may be through holes or blind holes. The blind holes may be of any suitable depth shorter than the depth of the motor hub support portion 206. The positioning holes may be of a screw type (i.e. with a threaded surface) or a smooth surface type.

In various alternate embodiments, a plurality of magnetic disks may be clamped by the motor hub support surface 210 and the clamp disk support surface 218. The plurality of magnetic disks may be arranged in a stack. Each magnetic disk may be separated from a neighbouring magnetic disk by a ring type spacer to provide a gap between the disks. The first surfaces of the plurality of magnetic disks may face the motor hub support surface 210. The second surfaces of the plurality of magnetic disks may face the clamp support surface 218. The motor hub support surface 210 may support a first magnetic surface of the bottom magnetic disk. The clamp disk support surface 218 may support a second surface of the top magnetic disk.

For such situations, the distance between the motor hub support surface 210 and a free end surface 264 of the protrusion 256 may be at least substantially equal or equal to the combination of the thicknesses of the plurality of magnetic disks, the spacers, and the clamp disk 212 so that, when the plurality of magnetic disks is clamped between the motor hub 204 and the clamp disk 212, the free end surface 264 of the protrusion 256 is at least substantially flush or flush with that surface (i.e. the first surface 242a) of the clamp disk 212, which is opposite to the clamp disk support surface 218.

Figure 3:
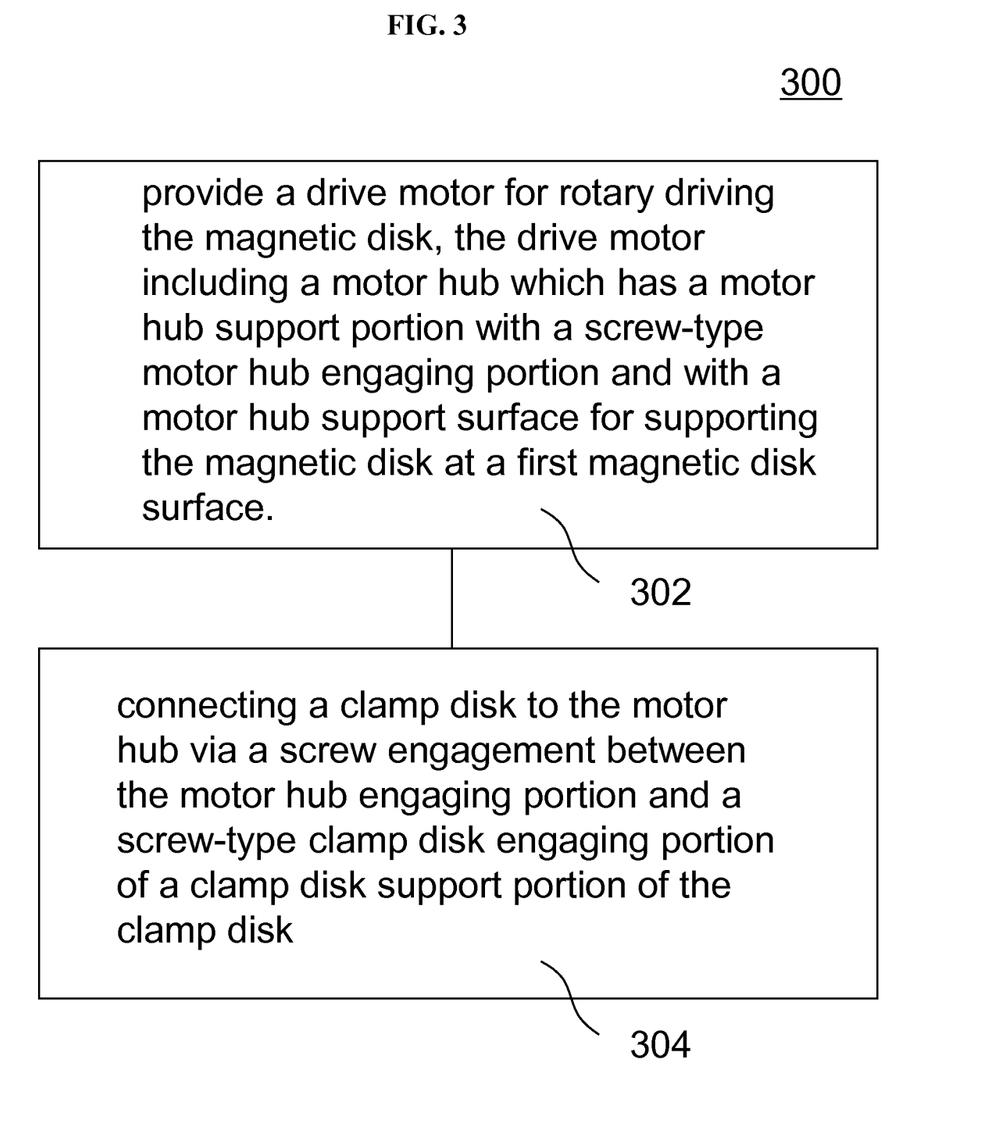
FIG. 3 is a schematic illustrating a method of forming a magnetic disk drive device according to various embodiments.

FIG. 3 is a schematic 300 illustrating a method of forming a magnetic disk drive device according to various embodiments.

The method may include, in 302, providing a drive motor for rotary driving the magnetic disk. The drive motor may include a motor hub which has a motor hub support portion with a screw-type motor hub engaging portion and with a motor hub support surface for supporting the magnetic disk at a first magnetic disk surface.

The method may also include, in 304, connecting a clamp disk to the motor hub via a screw engagement between the motor hub engaging portion and a screw-type clamp disk engaging portion of a clamp disk support portion of the clamp disk. The clamp disk engaging portion may be complementary to the motor hub engaging portion. The clamp disk support portion may further include a clamp disk support surface for supporting the magnetic disk at a second magnetic disk surface opposite the first magnetic disk surface. The clamp disk support surface may face the motor hub support surface when the clamp disk and the motor hub are in screw engagement, thereby allowing the magnetic disk to be supported between the motor hub and the clamping disk in a clamping manner by being clamped in between the motor hub support surface and the clamping disk support surface. The clamp disk may be of ring-shape with an inner through-hole which is provided with an inner thread to form the clamp disk engaging portion. The motor hub may have a protrusion provided with an outer thread to form the motor hub engaging portion.

The motor hub may have a disk-shaped top yoke which is attached to a motor shaft of the drive motor and on which the motor hub engaging portion and the motor hub support surface are provided.

The top yoke may be detachably attached to the motor shaft by means of a screw connection which is concentric with respect to a longitudinal axis of the motor shaft.

The clamp disk may be provided with one or more notches on its outer circumference for engaging by a mounting tool.

The clamp disk support surface may be provided with a soft damping layer of a material. The soft damping layer may be of rubber material.

The motor hub support portion may have a radial circumferential motor hub shoulder limiting an inner circumference of the motor hub support surface. The clamp disk support portion may have a radial circumferential clamp disk shoulder limiting an inner circumference of the clamp disk support surface.

The clamp disk shoulder and the motor hub shoulder may be radially flush when the motor hub and the clamp disk are engaged with each other so as to be able to provide an inner radial abutment for an inner circumferential wall of the magnetic disk.

The clamp disk may be provided with one or more notches on its outer circumference for engaging by a mounting tool.

The top yoke may include one or more positioning structures on a free surface so that the top yoke may be secured using the one or more positioning structures when the clamp disk is moved into the screw engagement with the motor hub.

A magnetic disk assembly may also be provided. The magnetic disk assembly may include a magnetic disk drive device according as described herein. The magnetic disk assembly may also include a magnetic disk, the magnetic disk comprising a first surface and a second surface opposite to the first surface.

The magnetic disk may be a ring-shaped disk. The magnetic disk may include a parking zone located at an inner circumferential side of the disk. The magnetic disk may further include a data zone located at an outer circumferential side of the disk, the data zone separated from the parking zone by a boundary.

A method of forming the magnetic disk assembly may include positioning the magnetic disk on the motor hub support surface. The magnetic disk may be positioned so that the inner circumferential side of the magnetic disk abuts the inner circumference of the motor hub support surface (as defined by the radial circumferential motor hub shoulder). The magnetic disk may be positioned on the motor hub support surface before connecting the clamp disk to the motor hub.

The clamp disk may include an outer diameter smaller than a diameter defining the boundary.

The clamp disk may be of ring-shape with an inner through-hole which is provided with an inner thread to form the clamp disk engaging portion. The motor hub may have a protrusion provided with an outer thread to form the motor hub engaging portion. The distance between the motor hub support surface and an free end surface of the protrusion may be at least substantially equal to the combination of the thicknesses of the magnetic disk and the clamp disk so that, when the magnetic disk is clamped between the motor hub and the clamp disk, the free end surface of the protrusion is at least substantially flush with that surface of the clamp disk, which is opposite to the clamp disk support surface. The magnetic disk may be positioned on the motor hub support surface so that the protrusion of the motor hub is fitted through a through hole defined by the inner circumferential side of the magnetic disk.

The motor hub support portion may have a radial circumferential motor hub shoulder limiting an inner circumference of the motor hub support surface. The clamp disk support portion may have a radial circumferential clamp disk shoulder limiting an inner circumference of the clamp disk support surface. An axial height of the motor hub shoulder as well as an axial height of the clamp disk shoulder may respectively be smaller than a thickness of the magnetic disk. The clamp disk shoulder and the motor hub shoulder may be radially flush when the motor hub and the clamp disk are engaged with each other so as that, when the magnetic disk is clamped between the motor hub and the clamp disk, an inner circumferential wall of the magnetic disk radially abuts both the motor hub shoulder and the clamp disk shoulder.

While a clamp disk including a clamp disk support portion with a screw-type clamp disk engaging portion complementary to the motor hub engaging portion so that the clamp disk and the motor hub are connectable to each other via a screw engagement between the motor hub engaging portion and the clamp disk engaging portion is described herein, it may also be envisioned that the clamp disk may be connectable to the motor hub via any other locking or fastening means. The motor hub may be provided with an interlocking mechanism and the clamp disk may be provided with a complementary interlocking mechanism so that the interlocking mechanism and the complementary interlocking mechanism may be engaged with each other to connect the clamp disk to the motor hub. The clamp disk may also be connectable to the motor hub via magnetic means or means other than mechanical means. Using a screw engagement advantageously offers a simple and easy way to connect the clamp disk and the motor hub.

Methods described herein may further contain analogous features of any magnetic disk drive device or magnetic disk assembly described herein. Correspondingly, magnetic disk drive device or magnetic disk described herein may further contain analogous features of any methods described herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A magnetic disk drive device for rotary driving a magnetic disk, the magnetic disk drive device comprising:
   a drive motor for rotary driving the magnetic disk, the drive motor comprising a motor hub which has a motor hub support portion with a screw-type motor hub engaging portion and with a motor hub support surface for supporting the magnetic disk at a first magnetic disk surface; and
   a clamp disk comprising a clamp disk support portion with a screw-type clamp disk engaging portion complementary to the motor hub engaging portion so that the clamp disk and the motor hub are connectable to each other via a screw engagement between the motor hub engaging portion and the clamp disk engaging portion, and with a clamp disk support surface for supporting the magnetic disk at a second magnetic disk surface opposite the first magnetic disk surface, the clamp disk support surface facing the motor hub support surface when the clamp disk and the motor hub are in screw engagement, thereby allowing the magnetic disk to be supported between the motor hub and the clamping disk in a clamping manner by being clamped in between the motor hub support surface and the clamp disk support surface,
   wherein the motor hub support portion has a radial circumferential motor hub shoulder limiting an inner circumference of the motor hub support surface, and
   wherein the clamp disk support portion has a radial circumferential clamp disk shoulder limiting an inner circumference of the clamp disk support surface, the clamp disk shoulder and the motor hub shoulder being radially flush when the motor hub and the clamp disk are engaged with each other so as to be able to provide an inner radial abutment for an inner circumferential wall of the magnetic disk.

2. The magnetic disk drive device according to claim 1, wherein the clamp disk is of a ring-shape with an inner through-hole which is provided with an inner thread to form the clamp disk engaging portion, and wherein the motor hub has a protrusion provided with an outer thread to form the motor hub engaging portion.

3. The magnetic disk drive device according to claim 1, wherein the motor hub has a disk-shaped top yoke which is attached to a motor shaft of the drive motor and on which the motor hub engaging portion and the motor hub support surface are provided.

4. The magnetic disk drive device according to claim 3, wherein the top yoke is detachably attached to the motor shaft by means of a screw connection which is concentric with respect to a longitudinal axis of the motor shaft.

5. The magnetic disk drive device according to claim 1, wherein the clamp disk is provided with one or more notches on its outer circumference for engaging by a mounting tool.

6. The magnetic disk drive device according to claim 1, wherein the clamp disk support surface is provided with a soft damping layer of a material.

7. The magnetic disk drive device according to claim 6, wherein the soft damping layer is of rubber material.

8. The magnetic disk drive device according to claim 3, wherein the clamp disk is provided with one or more notches on its outer circumference for engaging by a mounting tool; and
wherein the top yoke comprises one or more positioning structures on a free surface so that the top yoke may be secured using the one or more positioning structures when the clamp disk is moved into the screw engagement with the motor hub.

9. The magnetic disk drive device according to claim 8, wherein the one or more positioning structures are positioning holes.

10. A magnetic disk assembly comprising:
a magnetic disk, the magnetic disk comprising a first surface and a second surface opposite to the first surface; and
a magnetic disk drive device for rotary driving the magnetic disk, the magnetic disk drive device comprising:
a drive motor for rotary driving the magnetic disk, the drive motor comprising a motor hub which has a motor hub support portion with a screw-type motor hub engaging portion and with a motor hub support surface for supporting the magnetic disk at a first magnetic disk surface; and
a clamp disk comprising a clamp disk support portion with a screw-type clamp disk engaging portion complementary to the motor hub engaging portion so that the clamp disk and the motor hub are connectable to each other via a screw engagement between the motor hub engaging portion and the clamp disk engaging portion, and with a clamp disk support surface for supporting the magnetic disk at a second magnetic disk surface opposite the first magnetic disk surface, the clamp disk support surface facing the motor hub support surface when the clamp disk and the motor hub are in screw engagement, thereby allowing the magnetic disk to be supported between the motor hub and the clamp disk in a clamping manner by being clamped in between the motor hub support surface and the clamping disk support surface,
wherein the motor hub support portion has a radial circumferential motor hub shoulder limiting an inner circumference of the motor hub support surface,
wherein the clamp disk support portion has a radial circumferential clamp disk shoulder limiting an inner circumference of the clamp disk support surface,
wherein an axial height of the motor hub shoulder as well as an axial height of the clamp disk shoulder are respectively smaller than a thickness of the magnetic disk, and wherein the clamp disk shoulder and the motor hub shoulder are radially flush when the motor hub and the clamp disk are engaged with each other so as that, when the magnetic disk is clamped between the motor hub and the clamp disk, an inner circumferential wall of the magnetic disk radially abuts both the motor hub shoulder and the clamp disk shoulder.

11. The magnetic disk assembly according to claim 10, wherein the magnetic disk is a ring-shaped disk comprising:
a parking zone located at an inner circumferential side of the disk; and
a data zone located at an outer circumferential side of the disk, the data zone separated from the parking zone by a boundary.

12. The magnetic disk assembly according to claim 11, wherein the clamp disk has an outer diameter smaller than a diameter defining the boundary.

13. The magnetic disk assembly according to claim 10, wherein the clamp disk is of a ring-shape with an inner through-hole which is provided with an inner thread to form the clamp disk engaging portion,
wherein the motor hub has a protrusion provided with an outer thread to form the motor hub engaging portion, and
wherein the distance between the motor hub support surface and a free end surface of the protrusion is at least substantially equal to the combination of the thicknesses of the magnetic disk and the clamp disk so that, when the magnetic disk is clamped between the motor hub and the clamp disk, the free end surface of the protrusion is at least substantially flush with that surface of the clamp disk, which is opposite to the clamp disk support surface.

14. A magnetic disk drive device for rotary driving a magnetic disk, the magnetic disk drive device comprising:
a drive motor for rotary driving the magnetic disk, the drive motor comprising a motor hub which has a motor hub support portion with a screw-type motor hub engaging portion and with a motor hub support surface for supporting the magnetic disk at a first magnetic disk surface; and
a clamp disk comprising a clamp disk support portion with a screw-type clamp disk engaging portion complementary to the motor hub engaging portion so that the clamp disk and the motor hub are connectable to each other via a screw engagement between the motor hub engaging portion and the clamp disk engaging portion, and with a clamp disk support surface for supporting the magnetic disk at a second magnetic disk surface opposite the first magnetic disk surface, the clamp disk support surface facing the motor hub support surface when the clamp disk and the motor hub are in screw engagement, thereby allowing the magnetic disk to be supported between the motor hub and the clamping disk in a clamping manner by being clamped in between the motor hub support surface and the clamp disk support surface,
wherein the motor hub has a disk-shaped top yoke which is attached to a motor shaft of the drive motor and on which the motor hub engaging portion and the motor hub support surface are provided, and
wherein the top yoke is detachably attached to the motor shaft by means of a screw connection which is concentric with respect to a longitudinal axis of the motor shaft.

15. The magnetic disk drive device according to claim 14, wherein the clamp disk is provided with one or more notches on its outer circumference for engaging by a mounting tool; and
wherein the top yoke comprises one or more positioning structures on a free surface so that the top yoke may be secured using the one or more positioning structures when the clamp disk is moved into the screw engagement with the motor hub.

16. The magnetic disk drive device according to claim 15, wherein the one or more positioning structures are positioning holes.

\* \* \* \* \*